United States Patent [19]

Chen

[11] Patent Number: 5,378,539
[45] Date of Patent: Jan. 3, 1995

[54] CROSS-LINKED MELT PROCESSIBLE FIRE-RETARDANT ETHYLENE POLYMER COMPOSITIONS

[75] Inventor: Mark C. Chen, Wilmington, Del.

[73] Assignee: E. I. Du Pont de Nemours and Company, Wilmington, Del.

[21] Appl. No.: 853,088

[22] Filed: Mar. 17, 1992

[51] Int. Cl.$^6$ .............................................. D02G 3/00
[52] U.S. Cl. ................... 428/378; 174/113 R; 252/609; 264/83; 524/436; 428/461; 428/921
[58] Field of Search .............. 174/113 R; 252/609; 264/83; 524/436; 428/461, 378

[56] References Cited

U.S. PATENT DOCUMENTS

| | | | |
|---|---|---|---|
| 4,549,041 | 10/1985 | Shingo et al. | 174/113 R |
| 4,671,896 | 6/1987 | Hasegawa et al. | 252/609 |
| 4,762,750 | 8/1988 | Girgis et al. | 428/378 |
| 4,769,179 | 9/1988 | Kato et al. | 252/609 |
| 4,814,130 | 3/1989 | Shiromatsu et al. | 264/83 |
| 4,839,412 | 6/1989 | Harrell et al. | 524/436 |
| 4,840,987 | 6/1989 | Sakamoto | 524/436 |

FOREIGN PATENT DOCUMENTS 0370517  5/1990  European Pat. Off. .

Primary Examiner—Edith Buffalow
Attorney, Agent, or Firm—Craig H. Evans

[57] ABSTRACT

This invention provides a flame-retardant thermoplastic composition comprising a blend of ethylene copolymers, polyethylene, metal hydroxides and optionally a coupling agent and a compatibilizing agent, which is mildly cross-linked during blending with a peroxide and a polyfunctional compound. The composition has superior flame retardancy and a good balance of mechanical properties and electrical insulating properties, and maintains melt processibility for use as a sheath or insulation for wires and cables.

15 Claims, No Drawings

CROSS-LINKED MELT PROCESSIBLE FIRE-RETARDANT ETHYLENE POLYMER COMPOSITIONS

FIELD OF THE INVENTION

The present invention relates to a fire-retardant ethylene polymer composition and, particularly, to a cross-linked melt processible fire-retardant ethylene polymer which is useful for the sheath and insulation of electric wires and cables, and more particularly to a strong ethylene polymer which may be cross-linked before melt forming.

BACKGROUND OF THE INVENTION

Prior art flame-retardant resin compositions used for the insulation and the sheath of electric wires and cables include compositions such as those produced by mixing a flame retardant such as antimony trioxide, a chlorine flame retardant or a bromine flame retardant with a polyethylene, ethylene-vinyl acetate copolymer, ethylenepropylene rubber, polyvinylchloride resin, chloroprene rubber, chloro sulfonated polyethylene rubber or the like.

Because these compositions contain halogens in their base resins or flame-retardants, they produce at high temperatures large amounts of toxic gases such as a hydrogen halide gas and a halogen gas, resulting in a serious health and safety problem. Heavy smoke emission that results from the combustion is another problem. Thus, products using these compositions are not appropriate to use in a place where safety is highly required, for example, an underground railway, building, ship, nuclear power plant. Furthermore, halogen gases and hydrogen halide gases are not advantageous because they corrode the adjacent conductor and the like.

It is known to use inorganic fire retardants such as metal hydroxides rather than halogen containing compounds to produce flame-retardant polymer compositions; however, rubber or plastic materials free of tiny halogen are inferior in flame retardancy to compositions using materials containing a halogen and a halogen flame retardant. The high levels of metal hydroxides required to achieve adequate fire retardance undesirably decreases mechanical and electrical insulation properties of the polymer. In particular, compositions with high levels of metal hydroxides exhibit reduced mechanical characteristics especially in respect of tensile strength and elongation and impaired aging characteristics. Various methods have been used to restore and improve properties, such as careful choice of polymer and copolymer compositions, use of selected "coupling agents," and cross-linking during or after melt forming the material on such forms as wire coatings.

With respect to the conventional cable, when the inner structural members of the cable core made of materials such as polyethylene and cross-linked polyethylene are exposed to flames in a fire, they become molten and flow to the surface of the cable where they are gasified in a high temperature atmosphere and immediately catch fire, so that the cable burns and makes the fire larger.

In order to improve the conventional flame-retardant resin compositions and thermal resistance in addition to flame retardancy, cross-linking is made on the base resins such as polyethylene and ethylenepropylene rubber. Cross-linking is customarily performed after the polymer composition has been applied to the electric wire or cable, because cross-linked polymers are generally intractable and not processible. Chemical cross-linking and electron beam cross-linking are frequently used for such treatment. In chemical cross-linking the composition is usually heat treated by steam, etc., under a high temperature and pressure. Electron beam cross-linking requires an electron beam emitting chamber and apparatus.

In conventional chemical cross-linking of the polymer which has been applied to the electric wire or cable, by the use of a peroxide or the like, a material adjacent to the polymer composition to be cross-linked can be deformed because the cross-linking is carried out under a high temperature and pressure. For example, the inner core of the cable can be heat deformed by the cross-linking of the sheath thereof. On the other hand, in electron beam cross-linking it is difficult for an electron beam to reach to the innermost of the polymer composition layer to be cross-linked resulting in nonuniform cross-linking and poor mechanical properties. For example, in a relatively thick sheath only the surface portion thereof can be cross-linked. Electron beam cross-linking is disadvantageous in that it is particularly difficult to completely cross-link a thick layer of the composition. In addition, chemical cross-linking or electron beam cross-linking often require large cross-linking equipment which increases equipment and maintenance costs.

U.S. Pat. No. 4,549,041 describes a cross-linked composition which may contain an olefin resin including an olefin copolymer, metal hydroxides and coupling agents, and which incorporates a vinyl silane grafted olefin resin which provides a site which is cross-linkable by moisture with or without a "catalyst" after and possibly during extrusion forming of product such as coated wire. The finished products such as wires and cables remain intact and have the improved properties which cross-linking can achieve; however, the process is cumbersome and expensive because components of the complete composition must be partially preblended and kept dry and separate to prevent cross-linking prior to a final blending and extrusion forming step. There is no indication that cross-linking prior to extrusion forming would be desirable, practical, or produce a composition which was processible.

U.S. Pat. No. 4,769,179 describes a composition which may contain an ethylene copolymer and optionally polyethylene, a hydrate of a metallic oxide and a phosphorus containing titanate coupling agent. The composition is cross-linked by use of 0.1 to 20 parts of a cross-linking agent or ionizable radiation. There is no indication that cross-linking is controlled and that cross-linked compositions could be formed into molded or extruded forms such as coated wire.

U.S. Pat. No. 4,839,412 discloses a composition containing ethylene copolymers, optionally polyethylene, aluminum or magnesium hydroxide together with maleic anhydride grafted polymer. The combination attempts to provide a balance of mechanical properties and fire retardancy. The composition is not cross-linked.

None of the prior art references disclose a flame-retardant composition which is partially cross-linked before melt forming and retains good mechanical properties and flame retardancy.

SUMMARY OF THE INVENTION

This invention relates to a flame retardant, melt processible composition comprising a blend of:
(a) 50–95 parts of an ethylene copolymer of ethylene and at least one other monomer selected from vinyl acetate and esters of acrylic or methacrylic acid and optionally up to 2 weight percent of acrylic or methacrylic acid;
(b) 5–45 parts of polyethylene, provided that when the polyethylene is high density polyethylene ("HDPE") or medium density polyethylene ("MDPE") it does not exceed 40 weight percent of the combined weight of (a) and (b); and
(c) the following per 100 parts of (a) plus (b):
  (i) 100–140 parts of an inorganic fire retardant, such as magnesium or aluminum hydroxide or mixtures thereof, preferably magnesium hydroxide;
  (ii) 0.05–0.6 parts of a cross-linking initiator;
  (iii) 0.1–1.0 parts of a cross-linking coagent such as a polyfunctional vinyl compound;
  (iv) 0–10 parts of a coupling agent;
  (v) 0–10 parts of a compatibilizing agent; and
  (vi) 0 to 40 parts of calcium carbonate, zinc carbonate or zinc borate hydrate.

The amount of the cross-linking agent is sufficient to partial cross-link the polymer composition. The final blend is flexible, yet is strong, durable and flame-retardant. It contains no halogens and therefore produces no toxic gas such as hydrogen halide gas or a halogen gas. Most important, the final blend is also melt processible after chemical cross-linking, so as to allow application of the blend to the support after cross-linking thereby improving the uniformity of cured polymer and reducing the cost of equipment and maintenance required to cross-link the polymer after it has been applied to the support. Also, it is not necessary to subject the blend to moisture or electron beam radiation to accomplish the cross-linking. This composition is particularly suited to fire retardant coatings or sheaths for electric wires, cables and the like, particularly for cables used in the communications industry.

DETAILED DESCRIPTION OF THE INVENTION

A composition according to the present invention is defined as a blend of:
(a) 50–95 parts of an ethylene copolymer of ethylene and at least one other monomer selected from vinyl acetate and esters of acrylic or methacrylic acid and optionally up to 2 weight percent of acrylic or methacrylic acid;
(b) 5–45 parts of polyethylene, provided that when the polyethylene is HDPE or MDPE it does not exceed 40 weight percent of the combined weight of (a) and (b); and
(c) the following per 100 parts of (a) plus (b);
  (i) 100–140 parts of an inorganic fire retardant, such as magnesium or aluminum hydroxide, or mixtures thereof, preferably magnesium hydroxide;
  (ii) 0.05–0.6 parts of a cross-linking initiator such as an organic peroxide;
  (iii) 0.1–1.0 parts of a cross-linking coagent such as a polyfunctional vinyl compound;
  (iv) 0–10 parts of a coupling agent;
  (v) 0–10 parts of a compatibilizing agent; and
  (vi) 0 to 40 parts of calcium carbonate, zinc carbonate or zinc borate hydrate.

Ethylene copolymers are particularly useful in the present composition because of their polarity compared with polyethylene. The ethylene copolymer is made from ethylene and one or more monomers selected from vinyl acetate and esters of acrylic or methacrylic acid. Such ethylene copolymers are known to more readily accept the nonhalogen containing metal hydroxide fire retardants such as magnesium and aluminum hydroxide and also improved extrudability of the composition. The ethylene copolymers useful in the invention are ethylene vinyl acetate or ethylene vinyl acetate with methacrylic acid as a copolymer and ethylene alkyl acrylate. The vinyl acetate or ester content of the copolymer can be between 20 and 50 weight percent. The average comonomer content is preferably between 25 and 45 weight percent. Mixtures of copolymers are also suitable. It has also been found that the presence of an ethylene vinyl acetate methacrylic acid terpolymer with a level of methacrylic acid of about one weight percent provides greater versatility in formulating the product. Melt index of the ethylene copolymer does not appear to be especially critical, and copolymers with melt indices of from abut 0.5 to about 10 have been used.

Polyethylene, preferably HDPE, MDPE or linear very low density polyethylene ("LVLDPE"), is blended with the ethylene copolymers. Polyethylene is known for use in fire-retardant olefin polymer compositions. While the function of the two olefin polymer components is not clear, it is believed that the crystallinity of the polyethylene provides a higher level of tensile strength along with other favorable heat distortion properties, which the ethylene copolymer alone does not provide. The copolymer provides a level of polarity to allow high loadings of the fire retardant filler, which the polyethylene alone does not provide. High density polyethylene (HDPE), medium density polyethylene (MDPE) and even linear very low density polyethylene (LVLDPE) have been found to be suitable.

Examples of suitable inorganic fire retardant fillers include magnesium hydroxide, aluminum hydroxide, antimony trioxide, zinc borate, red phosphorus, sodium antimonate, ammonium primary phosphate, ammonium secondary phosphate, ammonium bromide, ammonium borate, and ammonium sulfamate, or mixtures thereof. Various such hydroxides are available commercially, some being coated to aid in filler dispersion and incorporation into the matrix. Examples are Kisuma 5A, B and 5AN which are fatty acid coated magnesium hydroxide manufactured by Kyowa Chemical, Magnifin which is magnesium hydroxide manufactured by Martinswerk Company, and Solem 932 OSC which is a silane treated aluminum hydroxide manufactured by Solem Industries. Magnesium hydroxide or blends of magnesium hydroxide with zinc carbonate or zinc borate hydrate with a higher proportion of magnesium hydroxide are preferred. As noted above, halogen-based fire retardants are not favored because of the production of toxic gases at high temperatures. Also, when aluminum hydroxide is used., processing at high temperature (about 200° C.) causes void formation due to decomposition of aluminum hydroxide.

When blended with the copolymer, these serve to retard combustion of that copolymer at high temperatures. It is believed that this flame retarding reaction takes place as follows: When the metallic hydrate is heated to high temperatures, crystal water is dissociated and released. The copolymer which is blended with the metallic hydrate loses heat due to dissociation of the crystal water when heated to high temperatures due to a fire or the like so that the temperature thereof drops, thus retarding the burning of the resin.

Although the amount of the inorganic fillers is determined in view of the desired degree of flame retardancy, compatibility with the copolymer with which it is to be mixed is important. It is according to the present invention generally used in an amount of about 100 to about 200 parts by weight, preferably about 130–170 parts by weight per 100 parts of the ethylene copolymer/polyethylene mixture. With less than about 100 parts by weight of the inorganic fillers a sufficient amount of the crystal water cannot be released, thus resulting in unacceptable flame retardancy. On the other hand, with more than about 170 parts by weight of the inorganic fillers, forming quality of the cross-linkable compound imparts poor mechanical properties.

Calcium carbonate may also be added to the blend in a quantity of preferably 10 to 20 parts per 100 parts of polymeric component, most preferably 20 parts. Zinc carbonate may be added to the blend in a quantity of preferably 20 to 40 parts per 100 parts of polymeric component, most preferably 40 parts to improve flame retardancy. Calcium carbonate or zinc carbonate are used to absorb any acid gasses which may evolve, usually during a fire. While not essential for the purposes of this invention, for many wire and cable compositions it is preferred. A suitable calcium carbonate grade is Ultraflex manufactured by Whittaker, Clark and Daniels, Inc.

"Coupling agents" are known to be useful in providing improved properties in highly filled compositions. Coupling agents include organo phosphorus titanates, organo zirconates, silane-type coupling agents among others. Coupling agents suitable in the present invention include but are not limited to Silane A172, a vinyl silane coupling agent manufactured by Union Carbide Company, Kenreact CAPOW KRTTS/H, NZ12/H and L-12/H manufactured by Kenrich Petrochemicals. The nature and mechanism by which "coupling agents" function is both varied and not fully understood. Coupling agents are not absolutely essential, but have in general been found to be advantageous when used at a level of up to about 10, preferably 0.5 to 2 parts per 100 parts of polymer component.

"Compatibilizing agents" are also helpful, but not essential. Compatibilizing agents are described in U.S. Pat. No. 4,839,412. They help compatibilize the copolymer and polyethylene (as distinct from the polymers and filler/fire retardant). Examples are maleic anhydride grafted polyethylene, and maleic anhydride grafted ethylene vinyl acetate. Such grafted copolymers are useful up to a level of about 10 weight percent.

Antioxidants are also advantageous though not essential to the composition. Suitable antioxidants include the amine type or the hindered phenol type. Examples include Naugard 445, an amine type manufactured by Uniroyal Company; Irganox 1010, a hindered phenol type manufactured by Ciba Giegy Company and Hostanox 03, also a hindered phenol type manufactured by Hoechst Company.

A key feature of the composition is the incorporation of a controlled amount of a cross-linking initiator, preferably an organic peroxide, and a cross-linking coagent which provide a controlled level of cross-linking such that the strength and fire retardancy properties of the composition are improved while melt processibility is maintained. Unlike conventional silane treated polyethylene or ethylene copolymers, the ethylene copolymer/polyethylene blend of the present invention is not readily cross-linked by external moisture and the degree of cross-linking may be readily controlled by the amount of cross-linking initiator and coagent that are utilized, so as to provide the desired properties. The cross-linking initiator and coagent may be blended with the ethylene copolymer/polyethylene mixture prior to extrusion of the material. In this application, the term cross-linking coagent is meant to mean a di or polyfunctional compound which when incorporated into the polymer forms a cross-link.

Various organic peroxides are suitable to initiate cross-linking. Conventionally, the cross-linking initiator is activated at temperatures higher than the melt blending temperature used to mix the components. As such, the components may be mixed and applied to the product, e.g., extruded onto a telephone wire, and then the coated telephone wire is heated to a temperature higher than the melt blending temperature to activate the cross-linking initiator. The cross-linking conventionally occurs after the composition has been applied to the wire. The key limitation of the cross-linking initiator in the present invention is that it be sufficiently active but not too active at the melt blending temperature used to prepare the compositions. Cross-linking occurs at the time of blending, but the composition is sufficiently melt processible to be applied to the product. As noted above, the melt processible composition retains all of the other advantageous properties known in the prior. Examples of suitable peroxide initiators useful in the present invention include 1,1-bis(t-butyl peroxy)-3,3,5 trimethyl cyclohexane (Luperco 23 1XL, manufactured by Noury Chemical, or Percadox 29/40 manufactured by Pennwalt Corporation) tert-butylcumyl peroxide (Kayabutyl C, product of Kayaku Nouly Corp.), a,a'-bis(tert-butyl-peroxy-m-isopropylbenzene) (Perabutyl P, product of Nippon Oils & Fats Co., Ltd.), 2.5-dimethyl-2,5-ditert-butylperoxy)hexyne (Perhexa 25B, product of Nippon Oils & Fats Co., Ltd.), dicumyl peroxide (Percumyl D, product of Nippon Oils & Fats Co., Ltd.), etc. Of these, 1,1-bis(t-butyl peroxy) -3,3,5 trimethyl cyclohexane, is especially suitable. 5 The level of peroxide found to be effective in combination with the cross-linking agent is from 0.05 to 0.6 parts per 100 parts of polymeric component. The peroxides used in the present invention (as described in the Examples) are powders containing 40% by weight of the active peroxide. Peroxides can initiate cross-linking alone in some materials under certain conditions, as well as initiating cross-link incorporation via polyfunctional compounds.

Cross-linking coagents may be used in conjunction with the peroxide initiators. Various known compounds are usable as cross-linking coagents insofar as they have at least two groups containing a reactive carbon-to-carbon double bond in the molecule. Examples of useful cross-linking coagents are aromatic polyfunctional compounds such as divinylbenzene, diallyl phthalate, dially isophthalate, 4,4'-isopropylidenediphenol bis(diethyleneglycolmethacrylate )ether, triallyltrimellitate and 2,2'-bis(4-acryloxy diethoxyphenyl)propane, aliphatic polyfunctional compounds such as syn-1,2-polybutadiene, 1,4-butanediol diacrylate, N,N'-methylenebisacrylamide, ethylene glycol dimethacrylate, neopentyl glycol dimethacrylate, trimethylolpropane trimethacrylate, 1,6-hexanediol diacrylate, diethylene glycol dimethacrylate, triethylene glycol dimethacrylate, 1,6-hexanediol dimethacrylate and tetrahexanediol dimethacrylate, alicylic polyfunctional compounds such as trially isocyanurate, triallyl cyanurate, triacryloyhexahydro-1,3,5-triazine and diacryl chlorendate, metal-containing polyfunctional compounds such as aluminum acrylate, aluminum methacrylate, zinc acrylate, zinc methacrylate, magnesium acrylate, magnesium methacrylate, calcium acrylate, calcium methacrylate, zircon acrylate and zircon methacrylate, etc. Of these compounds, especially preferable is trimethylopropane trimethacrylate.

The cross-linking coagent is incorporated into the present composition usually in amount of 0 to about 1.0 parts by weight, preferably about 0.1 to about 0.6 parts by weight, per 100 parts by weight of the polymeric components. Use of more than 0.6 parts by weight of the cross-linking coagent is not desirable because the resulting composition then tends to be too highly cross-linked, thereby becoming intractible and unprocessible and further exhibiting lower mechanical characteristics. Use of less than about 0.1 part by weight of the agent is not desirable either, because the agent then fails to produce the desired cross-linking.

The precise ratio of the various components is not critical, so long as the components are present in the specified ranges. For example, the precise ratio of ethylene copolymer to polyethylene is not critical; however, the limits of preferred combinations depends on the particular types and amounts of the several other ingredients such as the particular coupling agent and hydroxide filler. The examples provide illustrative trends which enable one skilled in the art to ascertain the most suitable compositions. It is apparent that the amounts and composition of the various components may be varied within specified composition limits to arrive at suitable compositions.

Preparation of the compositions may be made in a batch or continuous process by blending components by any of the conventional blending methods such as a roll mill, a Banbury mixer, biaxial extruder, Buss Kokneader or the like. The precise blending temperature of the composition is not critical, so long as the materials are adequately blended. Depending on the precise blending temperature of the composition and the activation temperature of the cross-linking initiator, it may be possible to maintain a constant temperature for effectuating blending and cross-linking. Alternately, it may be preferable to increase the temperature of the composition after blending in order to effectuate cross-linking. The compositions can be formed by any of the conventional methods such as compression molding, extrusion coating, calendering, injection molding or the like.

It is an important feature of the present invention that the cross-linked polymer composition is melt processible and may be applied to a structure such as an electric cable or wire after the cross-linking has been accomplished. As a result, one step is removed from the prior art process; e.g., it is no longer necessary to apply the flame retardant composition to a structure and then contact it with moisture (for silane treated polyethylene or ethylene copolymer compositions), electron beam radiation or a catalyst in order to form a finished product with desired flame retardancy, mechanical properties and electrical resistance.

Another important property of the inventive composition is ease of evaluation. Because the partially cross-linked compositions are melt processible, they may readily be compression molded to form samples for testing.

In order to evaluate the properties of the inventive composition, the components were compression molded for mechanical and electrical testing and for fire retardancy as described in the examples below. The following tests were carried out according to the indicated procedures:

| Table of Test Methods | |
|---|---|
| Test | Procedure |
| Tensile Strength | ASTM D-638, D-412 |
| Elongation at Break | ASTM D-638, D-412 |
| Limited Oxygen Index ("LOI")* | ASTM D-2813 |
| NBS Smoke Density | ASTM E-662 |
| Heat Distortion | ASTM D-1047 |
| Dielectric Constant | ASTM D-150 |
| Melt Flow Rate | ASTM D-1238/F |

*Measured to nearest 1%

Tensile properties are generally considered suitable if tensile strength is about 10 MPa, and elongation is above about 200%. LOI should be above about 30.0 and melt flow should be above 1.0 g/10 minute. Heat distortion must be less than 50% at 90° C. Such properties are typical of the compositions useful for wire and cable jacketing and have been used as a guide to determine generally useful fire retardant compositions.

EXAMPLES

The blends described in the following tables were prepared by blending all of the indicated ingredients except for the antioxidant in a Banbury mixer. The blends were mixed to 160° C. and held at 160° C. for 5 minutes before discharging. The discharged blend was further blended with the antioxidant on a two-roll mill whose temperature was maintained at about 125°-150° C. When incorporation was complete, the composition was sheeted off the mill, and test samples were prepared. The blends without the peroxide were prepared by blending the indicated ingredients on a Banbury mixer until a temperature of 160° C. was reached. Then the contents were discharged from the chamber to a two-roll mill and sheeted off the mill.

Slabs of the composition having the dimensions 15.2 cm×15.2 cm×0.2 cm and 15.2 cm×15.2 cm×0.32 cm were prepared by compression molding. Compression molding of these samples were carried out on two 20.3 cm×20.3 cm×0.49 cm plates (Plate A) and a 20.3 cm×20.3 cm×0.2 cm or 0.32 cm plate (Plate B) which had a 15.2 cm×15.2 cm×0.2 cm or 0.32 cm cavity. A 0.23 mm thick Teflon ® film was placed on Plate A. It was followed by placing Plate B and a sheet of compound inside the cavity of Plate B. Another Teflon ® film was then placed on tope of Plate B and the sheet of compound. Finally, the other Plate A was placed on tope of the Teflon ® film. This assembly was placed in a preheated Pasedena Hydraulic Press and heated at 163° C. for 5 minutes with the platens closed to touch pressure. The pressure was then increased to 40,000 pounds force as read from the pressure gauge of the press. The assembly was heated at 163° C. under pressure for 5 minutes. The closed assembly was then removed from the heated press, and placed in a water-cooled press. When the assembly reached room temperature, the slab was removed from the plates.

The 0.2 cm thick slabs were tested for stress/strain properties, heat distortion, limited oxygen index and dielectric constant and the 0.32 cm thick slabs were tested for smoke generation, according to the test methods listed in the Table. The test results are shown in Tables 1 to 7. Where blanks appear in the Table, the property value was not determined.

The compositions described in the Tables consist of 100 parts by weight matrix polymer excluding the graft copolymer which was used for a compatibilizing agent. This matrix polymer consists of ethylene copolymers and polyethylene. The amounts of other ingredients added to the composition are expressed as parts per 100 parts of the matrix polymer.

| Table of Composition | |
|---|---|
| EVA #1 | Ethylene/Vinyl Acetate Copolymer (28 wt. % VA, MI 3) |
| EVA #2 | Ethylene/Vinyl Acetate/Acid Terpolymer (28 wt. % VA, 1 wt. % Acid, MI 6) |
| EVA #3 | Ethylene/Vinyl Acetate Copolymer (46 wt. % VA, MI 2.5) |
| EVA #4 | Ethylene/Vinyl Acetate Copolymer (12 wt. % VA, MI 2.5) |
| EVA #5 | Ethylene/Vinyl Acetate Copolymer (18 wt. % VA, MI 2.5) |
| EVA #6 | Ethylene/Vinyl Acetate Copolymer (15 wt. % VA, MI 8) |
| EVA #7 | Ethylene/Vinyl Acetate Copolymer (12 wt. % VA, MI 8) |
| HDPE #1 | High Density Polyethylene, MI 0.4, Broad Molecular Wt. Distribution |
| HDPE #2 | High Density Polyethylene, Narrow Molecular Wt. Distribution |
| HDPE #3 | High Density Polyethylene, MI 3, Broad Molecular Wt. Distribution |
| MDPE | Medium Density Polyethylene (Type II, ASTM D-1248) |
| LVLDPE | Linear Very-low Density Polyethylene (Type I, ASTM D-1248 |
| Graft Copolymer | Graft of Maleic Anhydride (about 0.4 wt. %) onto Polyethylene, MI about 13 |
| Mg(OH)$_2$ #1 | Surface Treated Mg(OH)$_2$ Kisuma 5A from Kyowa Chem. Co. |
| Mg(OH)$_2$ #2 | Surface Treated Mg(OH)$_2$ Kisuma 5AN from Kyowa Chem. Co. |
| ATH #1 | Silane Treated Aluminum Hydroxide from Solem Industires of Huber Corp. |
| ATH #2 | Aluminum Hydroxide from Solem Industries |
| CaCO$_3$ #1 | Calcium Carbonate, Ground |
| CaCO$_3$ #2 | Calcium Carbonate, Precipitated from Whittaker, Clark and Daniels, Inc. |
| Antioxidant #1 | Substituted Diphenylamine; Naugard 445 from Uniroyal Chem. Co. |
| Antioxidant #2 | Butyric Acid 3,3-Bis (3-tert.-Butyl-4-Hydroxyphenyl) Ethylene Ester; Hostanox 03 from Hoechst |
| Antioxidant #3 | Tetrakis[Methylene(3,5-di-tert.-Butyl-4-Hydroxyhydrocinamate)]Methane; Irganox 1010 from Ciba-Geigy |
| Coupling Agent #1 | Vinyl Silane; Silane A-172 from Union Carbide |
| Coupling Agent #2 | Isopropyl Tristearoyl Titanate; Kenreact CAPOW KRTTS/H from Kenrich Petrochemicals |
| Coupling Agent #3 | Neoalkoxy Tris(dioctyl)phosphato zirconate; Kenreact CAPOW NZ12/H from Kenrich Petrochemicals |
| Coupling Agent #4 | Neoalkoxy Tri(dioctyl)phosphato Titanate; Kenreact CAPOW L-12/H from Kenrich Petrochemicals |
| Coagent | Trimethylol Propane Trimethacrylate; SR 350 from Arco Chemical |
| Organoperoxide | 1,1-Bis(tert.-Butylperoxy)-3,3,5-Trimethyl Cyclohexane; Luperco 231 XL from Noury Chemical (40% Reactive Ingredient) |
| Zinc Carbonate | From J. T. Baker |
| Zinc Borate Hydrate | From Climax Performance Materials Corp. |

TABLE 1

| | Example | | | |
|---|---|---|---|---|
| | 1 | 2 | 3 | 4 |
| EVA #1 | 70 | 60 | 80 | 80 |
| EVA #2 | 20 | 30 | 20 | 20 |
| EVA #3 | — | 10 | — | — |
| HDPE #1 | 10 | — | — | — |
| Graft Copolymer | 2 | 2 | 2 | 2 |
| Mg(OH)$_2$ #1 | 130 | 130 | 130 | 130 |
| ATH #1 | 10 | 10 | — | 10 |
| CaCO$_3$ #1 | 10 | 10 | 20 | 10 |
| Antioxidant #1 | 1.5 | 1.5 | 1.5 | 1.5 |
| Coupling Agent #1 | 1.5 | 1.5 | 1.5 | 1.5 |
| Stearic Acid | 1.5 | 1.5 | 1.5 | 1.5 |
| Coagent | 0.2 | 0.2 | 0.2 | 0.1 |
| Organoperoxide (40%) | 0.3 | 0.3 | 0.3 | 0.2 |
| Tensile Strength, MPa | 11.23 | 8.45 | 9.83 | 10.23 |
| % Elongation at Break | 518 | 409 | 330 | 454 |
| Limited Oxygen Index | 39 | 37 | 39 | 33 |
| Heat Distortion at 90° C., % | 17 | 67 | 69 | 82 |
| NBS Smoke Density, D max Flaming Mode | 83 | 104 | 131 | 98 |
| NBS Smoke Density, D maxNon-Flaming Mode | 176 | 202 | 197 | 215 |

Table 1 shows that when EVA, HDPE, graft copolymer, coupling agent, peroxide, coagent and 150 parts of inorganic fillers including 130 parts of Mg(OH)$_2$ are present, the composition gives good stress/strain properties, low heat distortion, high LOI and low smoke generation. This is seen in Example 1. When polyethylene is absent from the composition (Examples 2, 3 and 4), heat distortion is increased considerably, although LOI and smoke density are acceptable.

TABLE 2

| | Example | | | | | |
|---|---|---|---|---|---|---|
| | 5 | 6 | 7 | 8 | 9 | 10 |
| EVA #1 | 70 | 70 | 70 | 70 | 70 | 70 |
| EVA #2 | 20 | 20 | 20 | 20 | 20 | 20 |
| HDPE #1 | 10 | 10 | — | — | — | — |
| HDPE #2 | — | — | — | — | 10 | 10 |
| MDPE | — | — | 10 | 10 | — | — |
| Graft Copolymer | 2 | 2 | 2 | 2 | 2 | 2 |
| Mg(OH)$_2$ #2 | 130 | 130 | 130 | 130 | 130 | 130 |
| ATH #2 | 10 | — | 10 | — | 10 | 10 |
| CaCO$_3$ #1 | 10 | 20 | 10 | 20 | 10 | 10 |
| Antioxidant #2 | 1.5 | 1.5 | 1.5 | 1.5 | 1.5 | 1.5 |
| Coupling Agent #2 | 1.5 | 1.5 | 1.5 | 1.5 | 1.5 | 1.5 |
| Stearic Acid | 1.5 | 1.5 | 1.5 | 1.5 | 1.5 | 1.5 |
| Coagent | 0.3 | 0.3 | 0.3 | 0.3 | 0.2 | — |
| Organo peroxide (40%) | 0.5 | 0.5 | 0.5 | 0.5 | 0.3 | — |
| Tensile Strength, MPa | 10.2 | 10.5 | 9.56 | 9.71 | 10.45 | 7.66 |
| % Elongation at Break | 587 | 593 | 507 | 533 | 643 | 596 |
| Limited Oxygen Index | 39 | 38 | 35 | 35 | 34 | 34 |
| Melt Flow Rate g/10 min. | — | — | — | — | 28.9 | 47.1 |
| % Retension after aging at 100° C. for 7 days | | | | | | |
| Tensile Strength | — | — | — | — | 98 | 79 |
| % Elongation at Break | — | — | — | — | 88 | 26 |

In Table 2, Examples 5 to 9 show that, under the composition similar to Example 1, HDPE and MDPE impart the similar favorable stress/strain properties and LOI. The presence of the peroxide/coagent system contributes to partial cross-linking, which is evidenced by a decrease of melt flow rate as seen in Examples 9 and 10. Partial cross-linking is also observed to improve stress/strain properties and retention of stress/strain properties after heat aging.

TABLE 3

|  | Example | | | | | | | |
|---|---|---|---|---|---|---|---|---|
|  | 11 | 12 | 13 | 14 | 15 | 16 | 17 | 18 |
| EVA #1 | 70 | 70 | 70 | 70 | 60 | 60 | 35 | 35 |
| EVA #2 | 20 | 20 | — | — | — | — | — | — |
| EVA #4 | — | — | — | — | — | — | 25 | 25 |
| HDPE #3 | 10 | — | 30 | — | — | — | 40 | — |
| LVLDPE | — | 10 | — | 30 | 40 | 40 | — | 40 |
| Graft Copolymer | 2 | 2 | 2 | 2 | 3 | 2 | 4 | 3 |
| $Mg(OH)_2$ #2 | 140 | 130 | 140 | 120 | 120 | 130 | 120 | 120 |
| Zinc Carbonate | — | 40 | — | — | — | — | — | — |
| Antioxidant #2 | 1.5 | 1.5 | 1.5 | 1.5 | 1.5 | 1.5 | 1.5 | 1.5 |
| Coupling Agent #2 | 1.5 | — | 1.5 | 1.5 | 1.5 | 1.5 | 1.5 | 1.5 |
| Coupling Agent #3 | — | 1.5 | — | — | — | — | — | — |
| Steric Acid | 1.5 | 1.5 | 1.5 | 1.5 | 1.5 | 1.5 | 1.5 | 1.5 |
| Coagent | 0.3 | 0.3 | 0.3 | 0.3 | 0.3 | 0.3 | 0.3 | 0.3 |
| Organoperoxide (40%) | 0.5 | 0.5 | 0.5 | 0.5 | 0.5 | 0.5 | 0.5 | 0.5 |
| Tensile Strength, MPa | 12.98 | 10.14 | 11.23 | 11.23 | 10.43 | 9.27 | 11.56 | 9.16 |
| % Elongation at Break | 615 | 444 | 509 | 562 | 519 | 467 | 49 | 486 |
| Limited Oxygen Index | 35 | 40 | 33 | 32 | 30 | 31 | 29 | 32 |
| Dielectric Constant @ 1KHz | 3.63 | — | 3.48 | 3.39 | 3.29 | 3.30 | 3.20 | 3.19 |

Table 3 illustrates the compositions for insulation with favorable dielectric constants. It also compares the performance of LVLDPE with that of HDPE. When the HDPE level is increased to 40 parts, elongation drops precipitously, whereas under the same composition LVLDPE still provides acceptable stress/strain properties. This is exhibited in Examples 17 and 18. Example 12 indicates that the effect of LVLDPE is such that even the composition containing as much as 170 parts of inorganic fillers imparts good stress/strain properties.

TABLE 4

|  | Example | | | | | |
|---|---|---|---|---|---|---|
|  | 13 | 19 | 20 | 21 | 22 | 23 |
| EVA #1 | 70 | — | — | — | — | — |
| EVA #2 | — | — | — | — | 10 | 10 |
| EVA #5 | — | 70 | — | — | — | — |
| EVA #6 | — | — | 70 | — | — | 70 |
| EVA #7 | — | — | — | 70 | 70 | — |
| HDPE #3 | 30 | 30 | 30 | 30 | 20 | 20 |
| Graft Copolymer | 2 | 2 | 2 | 2 | 2 | 2 |
| $Mg(OH)_2$ #2 | 140 | 140 | 140 | 140 | 140 | 140 |
| Coupling Agent #2 | 1.5 | 1.5 | 1.5 | 1.5 | 1.5 | 1.5 |
| Antioxidant #2 | 1.5 | 1.5 | 1.5 | 1.5 | 1.5 | 1.5 |
| Stearic Acid | 1.5 | 1.5 | 1.5 | 1.5 | 1.5 | 1.5 |
| Coagent | 0.3 | 0.3 | 0.3 | 0.3 | 0.3 | 0.3 |
| Organoperoxide (40%) | 0.5 | 0.5 | 0.5 | 0.5 | 0.5 | 0.5 |
| Tensile Strength, MPa | 11.23 | 8.91 | 10.23 | 10.17 | 9.52 | 8.86 |
| % Elongation at Break | 509 | 17 | 20 | 9 | 26 | 43 |

Table 4 demonstrates the effect of vinyl acetate ("VA") content in EVA on stress/strain properties. Under the same composition, EVA containing 28 wt. % VA (Example 13) is superior to EVA containing 18, 15 or 12 wt. % VA (Examples 19–23) in providing good stress/strain properties, particularly in elongation.

TABLE 5

|  | Example | | | | |
|---|---|---|---|---|---|
|  | 24 | 25 | 26 | 27 | 28 |
| EVA #1 | 70 | 70 | 70 | 70 | 70 |
| EVA #2 | 20 | 20 | 20 | 20 | 20 |
| HDPE #3 | 10 | 10 | 10 | 10 | 10 |
| Graft Copolymer | 2 | 2 | — | 2 | — |
| $Mg(OH)_2$ #2 | 130 | 130 | 130 | 130 | 130 |
| $CaCO_3$ #2 | 20 | 20 | 20 | 20 | 20 |
| Coupling Agent #2 | 1.5 | — | — | — | — |
| Coupling Ageant #3 | — | 1.5 | — | — | 1.5 |
| Antioxidant #2 | 1.5 | 1.5 | 1.5 | 1.5 | 1.5 |
| Stearic Acid | 1.5 | 1.5 | 1.5 | 1.5 | 1.5 |
| Coagent | 0.3 | 0.3 | 0.3 | 0.3 | 0.3 |
| Organoperoxide (40%) | 0.5 | 0.5 | 0.5 | 0.5 | 0.5 |
| Tensile Strength | 10.29 | 10.89 | 8.91 | 10.71 | 10.98 |
| % Elongation at Break | 522 | 582 | 423 | 502 | 542 |
| Limited Oxygen Index | 37 | 37 | 32 | 33 | 32.5 |

Table 5 shows that EVA of 28 wt. % VA (Examples 24 and 25) provide good stress/strain properties. It also shows that the presence of a coupling agent and/or graft copolymer improves stress/strain properties (Examples 26 to 28).

TABLE 6

| | Example | | | | | | | | | |
|---|---|---|---|---|---|---|---|---|---|---|
| | 29 | 30 | 31 | 32 | 33 | 34 | 1 | 35 | 36 | 37 |
| EVA #1 | 70 | 70 | 80 | 80 | 80 | 80 | 70 | 70 | 70 | 70 |
| EVA #2 | 20 | 20 | — | — | — | 20 | 20 | 20 | 20 | 20 |
| HDPE #1 | 10 | 10 | 20 | 20 | 20 | — | 10 | 10 | 10 | 10 |
| Graft Copolymer | — | — | — | — | — | — | 2 | 2 | 2 | 2 |
| Mg(OH)$_2$ #1 | 125 | 125 | 150 | 150 | 150 | 150 | 130 | 130 | 130 | 130 |
| ATH #1 | — | — | — | — | — | — | 10 | — | — | — |
| ATH #2 | — | — | — | — | — | — | — | 10 | 10 | 10 |
| CaCO$_3$ #1 | — | — | — | — | — | — | 10 | 10 | 10 | 10 |
| Coupling Agent #1 | — | — | — | — | — | — | 1.5 | — | — | — |
| Coupling | — | — | — | — | — | — | — | 1.4 | 1.4 | 1.4 |
| Antioxidant #1 | 1.5 | 1.5 | 1.5 | 1.5 | 1.5 | 1.5 | 1.5 | — | — | — |
| Antioxidant | — | — | — | — | — | — | — | 1.5 | 1.5 | 1.5 |
| Stearic Acid | 1.5 | 1.5 | 1.5 | 1.5 | 1.5 | 1.5 | 1.5 | — | — | — |
| Oleamide | — | — | — | — | — | — | — | 1.5 | 1.5 | 1.5 |
| Coagent | — | — | — | — | — | — | 0.2 | 0.3 | 0.5 | 0.6 |
| Organoperoxide 40% | — | 0.2 | — | 0.2 | 0.3 | 0.3 | 0.3 | 0.5 | 0.7 | 1.0 |
| Heat Distortion @ 90° C. % | 88.4 | 49.6 | 81.0 | 24.9 | 20.3 | 82.3 | — | — | — | — |
| Melt Flow Rate g/10 min | — | — | — | — | — | — | 9.58 | 1.60 | 1.0 | 0.12 |

In Table 6, Examples 29 to 33 demonstrate the improvement of heat distortion by the treatment with peroxide in the compositions with different levels of Mg(OH)$_2$. Examples 33 and 34 show that even in the presence of peroxide the absence of HDPE causes high heat distortion. The effect of peroxide/coagent levels on melt flow rate is illustrated in Examples 1 and 35 to 37. Although peroxide imparts advantageous properties such as low heat distortion and high retention of stress/strain properties after heat aging as shown previously, as the peroxide level is increased, the degree of cross-linking is raised, consequently melt flow rate decreases and processability, particularly extrudability is adversely affected.

TABLE 7

| | Example | |
|---|---|---|
| | 12 | 38 |
| EVA #1 | 70 | 70 |
| EVA #2 | 20 | 20 |
| LVLDPE | 10 | 10 |
| Graft Copolymer | 2 | 2 |
| Mg(OH)$_2$ #2 | 130 | 130 |
| Zinc Carbonate | 40 | — |
| Zinc Borate Hydrate | — | 40 |
| Coupling Agent #3 | 1.5 | 1.5 |
| Antioxidant #2 | 1.5 | 1.5 |
| Stearic Acid | 1.5 | 1.5 |
| Coagent | 0.3 | 0.3 |
| Organoperoxide (40%) | 0.5 | 0.5 |
| Tensile Strength, MPa | 10.14 | 9.14 |
| % Elongation at Break | 444 | 500 |
| Limited Oxygen Index | 40 | 39 |
| Flaming Test - UL94 (thickness 0.2 cm) | | |
| 1st Application (Time of Combustion, sec.) | 0 | 0 |
| 2nd Application (Time of Combustion, sec.) | 3 | 2 |
| Dripping | No | No |
| Dielectric Constant at 1KHz | 3.79 | 3.83 |

Examples 12 and 38 of Table 7 exhibit a composition of high flame retardance by the use of zinc carbonate and Mg(OH)$_2$ or zinc borate hydrate and Mg(OH)$_2$ while maintaining good stress/strain properties.

What is claimed is:

1. A thermoplastic ethylene polymer composition comprising:

(a) 50-95 parts of an ethylene copolymer of ethylene and at least one other monomer selected from vinyl acetate and esters of acrylic or methacrylic acid and optionally up to 2 weight percent of acrylic or methacrylic acid;

(b) 5-45 parts of polyethylene, provided that when the polyethylene is high density polyethylene or medium density polyethylene it does not exceed 40 weight percent of the combined weight of (a) and (b); and (c) the following per 100 parts of (a) plus (b):
  (i) 100-140 parts of an inorganic fire retardant;
  (ii) 0.05-0.6 parts of a cross-linking initiator;
  (iii) 0.1-1.0 parts of a cross-linking coagent;
  (iv) 0-10 parts of a coupling agent;
  (v) 0-10 parts of a compatibilizing agent; and
  (vi) 0 to 40 parts of calcium carbonate, zinc carbonate or zinc borate hydrate.

2. The thermoplastic ethylene polymer of claim 1 in which the inorganic fire retardant is selected from the group comprising magnesium hydroxide, aluminum hydroxide or mixtures thereof.

3. The thermoplastic ethylene polymer of claim 1 in which the cross-linking coagent is a polyfunctional vinyl compound.

4. The thermoplastic ethylene polymer of claim 1 in which the cross-linking initiator is an organic peroxide.

5. The thermoplastic ethylene polymer of claim 4 in which the organic peroxide is 1,1-bis(t-butyl peroxy)-3,3,5 trimethyl cyclohexane.

6. The wire or cable coated with a thermoplastic ethylene polymer comprising:
  a wire or cable; and
  a coating on said wire or cable comprising:
    (a) 50-95 parts of an ethylene copolymer of ethylene and at least one other monomer selected from vinyl acetate and esters of acrylic or methacrylic acid and optionally up to 2 weight percent of acrylic or methacrylic acid;
    (b) 5-45 parts of polyethylene, provided that when the polyethylene is high density polyethylene or medium density polyethylene it does not exceed 40 weight percent of the combined weight of (a) and (b); and (c) the following per 100 parts of (a) plus (b):
  (i) 100–140 parts of an inorganic fire retardant;
  (ii) 0.05–0.6 parts of a cross-linking initiator;
  (iii) 0.1–1.0 parts of a cross-linking coagent;
  (iv) 0–10 parts of a coupling agent;
  (v) 0–10 parts of a compatibilizing agent; and
  (vi) 0 to 40 parts of calcium carbonate, zinc carbonate or zinc borate hydrate.

7. The wire or cable coated with a thermoplastic ethylene polymer of claim 6 in which the inorganic fire retardant is selected frown the group comprising magnesium hydroxide, aluminum hydroxide or mixtures thereof.

8. The wire or cable coated with a thermoplastic ethylene polymer of claim 6 in which the cross-linking coagent is a polyfunctional vinyl compound.

9. The wire or cable coated with a thermoplastic ethylene polymer of claim 6 in which the cross-linking initiator is an organic peroxide.

10. The wire or cable coated with a thermoplastic ethylene polymer of claim 9 in which the organic peroxide is 1,1-bis(t-butyl peroxy)-3,3,5 trimethyl cyclohexane.

11. A process for making a wire or cable coated with a thermoplastic ethylene polymer comprising: blending the following components:
  (a) 50–95 parts of an ethylene copolymer of ethylene and at least one other monomer selected from vinyl acetate and esters of acrylic or methacrylic acid and optionally up to 2 weight percent of acrylic or methacrylic acid;
  (b) 5–45 parts of polyethylene, provided that when the polyethylene is high density polyethylene or medium density polyethylene it does not exceed 40 weight percent of the combined weight of (a) and (b); and
  (c) the following per 100 parts of (a) plus (b):
    (i) 100–140 parts of an inorganic fire retardant;
    (ii) 0.05–0.6 parts of a cross-linking initiator;
    (iii) 0.1–1.0 parts of a cross-linking coagent;
    (iv) 0–10 parts of a coupling agent;
    (v) 0–10 parts of a compatibilizing agent; and
    (vi) 0 to 40 parts of calcium carbonate, zinc carbonate or zinc borate hydrate.
  (b) coating said wire or cable with the blended components.

12. The process for making a wire or cable coated with a thermoplastic ethylene polymer of claim 11 in which the inorganic fire retardant is selected from the group comprising magnesium hydroxide, aluminum hydroxide or mixtures thereof.

13. A The process for making a wire or cable coated with a thermoplastic ethylene polymer of claim 11 in which the cross-linking coagent is a polyfunctional vinyl compound.

14. The process for making a wire or cable coated with a thermoplastic ethylene polymer of claim 11 in which the cross-linking initiator is an organic peroxide.

15. The process for making a wire or cable coated with a thermoplastic ethylene polymer of claim 14 in which the organic peroxide is 1,1-bis(t-butyl peroxy)-3,3,5 trimethyl cyclohexane.

* * * * *